United States Patent

[11] 3,603,111

[72] Inventors: Erich Aucktor;
Walter Willimek, both of Offenback am Main, Germany
[21] Appl. No. 20,698
[22] Filed: Mar. 18, 1970
[45] Patented: Sept. 7, 1971
[73] Assignee: Lohr & Bromkamp GmbH
Offenbach am Main, Germany
[32] Priority: Mar. 20, 1969
[33] Germany
[31] P 19 14 275.7

[54] CONSTANT VELOCITY JOINT
10 Claims, 5 Drawing Figs.

[52] U.S. Cl. .................................................. 64/21
[51] Int. Cl. ................................................ F16d 3/30
[50] Field of Search .................................. 64/21, 23

[56] References Cited
UNITED STATES PATENTS
| | | | |
|---|---|---|---|
| 2,046,584 | 7/1936 | Rzeppa | 64/21 |
| 3,464,232 | 9/1969 | Hutchinson | 64/21 |
| 3,475,924 | 11/1969 | Aucktor | 64/21 |

Primary Examiner—Edward G. Favors
Attorneys—Curt M. Avery, Arthur E. Wilfond, Herbert L. Lerner and Daniel J. Tick ABSTRACT: Constant velocity joint includes an inner joint member axially displaceable with respect to a surrounding outer joint member, the outer joint member having an inner surface formed with grooves and the inner joint member having an outer surface formed with grooves, a plurality of balls respectively disposed within corresponding grooves of the inner and outer joint members for transmitting torque therebetween, cage means located between the inner and outer joint members and adapted to retain the plurality of balls in a common plane, the outer surface of the inner joint member at one axial end thereof having a spherical surface portion and at the other axial end thereof having a frustoconical surface portion.

PATENTED SEP 7 1971 3,603,111

CONSTANT VELOCITY JOINT

Our invention relates to constant velocity joints having an inner joint member axially displaceable with respect to an outer joint member, and especially for a Cardan shaft having two such joints and a freely movable intermediate shaft connecting the joints. This constant velocity joint is of the type wherein a plurality of balls are respectively disposed within corresponding grooves formed in the inner surface of the outer joint member and in the outer surface of the inner joint member for transmitting torque therebetween, the balls being retained in a common plane by a cage located between the inner and outer joint members.

In German Pat. No. 1,232,411 there has been disclosed a constant velocity joint of this type wherein the inner and outer joint members are displaceable relative to one another because the inner surface of the outer joint member is cylindrical and the outer surface of the cage is spherical and the inner surface of the cage is spaced with respect to the inner joint member so as to permit axial relative displacement of the cage with respect to the inner joint member. The axial displaceability of the inner joint member with respect to the outer joint member is limited by the abutment of the inner joint member in the end positions thereof, against the cage. In order to assure trouble-free and noiseless functioning of the joint even in these end positions of the inner joint member, the cage is formed with a spherical inner surface, and the outer surface of the inner joint member is formed of two spherical surface portions which have the same radius as that of the spherical inner surface of the cage and are located spaced from a main plane of a sphere, so that the outer surface of the inner joint member in axial section has substantially the contour or profile of a Gothic arch. The spacing between the centers of curvature of both spherical surface portions disposed on the axis of the inner joint member is thereby a measure for the displaceability of the inner joint member. When the joint is extended, the displacement of the inner joint member is double the spacing between the centers of curvature of the spherical surface portions. Upon axial relative displacement of the inner joint member and the outer joint member, the balls held in a common plane by the cage roll in the grooves provided in the outer surface of the inner joint member, the depth of the grooves diminishing toward the axial ends of the inner joint member due to the outer contour or profile of the inner joint member. Since a minimum depth of the grooves is required for adequate torque transmission and, for the same displacement distance with greater spacing between the centers of curvature of both spherical surface portions, the depth of the grooves diminishes for otherwise equal dimensions of the joint, the possibility is limited for increasing the spacing between the centers of curvature of the spherical surface portions and therewith the axial displaceability of the inner joint member.

For the joints of a Cardan shaft, which serves for the drive of an individually suspended drive wheel of a motor vehicle, and also for other uses of constant velocity universal joints, it may become necessary for otherwise equal dimensions of the joint that the displaceability of the inner joint member with respect to the outer joint member be still greater than is possible with the heretofore known prior art joint, and deflection angle and displacement distance of the joint members with respect to one another must remain in a relationship to one another resulting from the construction.

It is accordingly an object of our invention to provide constant velocity joint which avoids the aforementioned disadvantages of the heretofore known joints of this general type. More specifically, an object of our invention is to provide such joint which affords an improved axial displaceability of the inner joint member relative to the outer joint member, while permitting a considerable angle of deflection between the input and output shafts of the joint and while retaining grooves with adequate depth for receiving balls therein to provide efficient torque transmission.

With the foregoing and other objects in view, we provide constant velocity joint comprising an inner joint member axially displaceable with respect to a surrounding outer joint member, the outer joint member having an inner surface formed with grooves and the inner joint member having an outer surface formed with grooves, a plurality of balls respectively disposed within corresponding grooves of the inner and outer joint member for transmitting torque therebetween, cage means located between the inner and outer joint members and adapted to retain the plurality of balls in a common plane, the outer surface of the inner joint member at one axial end thereof, having a spherical surface portion and at the other axial end thereof having a frustoconical surface portion.

In accordance with other features of our invention, the cage means has an inner surface at the one axial end formed with a spherical surface portion and at the other axial end with a frustoconical or cylindrical surface portion, the cone angle of the frustoconical portion of the cage means being sharper than the cone angle of the frustoconical surface portion of the inner joint member.

In accordance with another feature of our invention, the cage is displaceable in each axial position of the inner joint member, through a given angle determined by a relationship between the angle of deflection of the joint and the relative displacement distance between the inner and outer joint members before abutting against the outer surface of the inner joint member.

In accordance with a further feature of our invention, the constant velocity joint is located at each end of a Cardan shaft used for the drive of an independently suspended drive wheel of a motor vehicle.

Since the outer contour or profile in axial section at an end of the inner joint member which is frustoconical, is flatter than a spherical surface portion, such as in a prior art joint would be at that end, the displaceability of the inner joint member with respect to the cage in this direction is greater than for the prior art joint, the displacement of the prior art member being limited by the abutment of the spherical surface of the cage. Due to the flatter outer contour, the groove depth over a greater range is adequate for torque transmission.

The limitation of the displacement of the inner joint member in one direction by the abutment of the spherical surface portion of the inner joint member of our invention against a hollow spherical surface of the cage, which assures trouble-free and noiseless operation of the joint in this end position, is desired because, in many cases, an axial force can act upon one of the joint members so as to tend to displace it in one direction with respect to the other. This is the case, for example, for a Cardan shaft driving the freely suspended wheels of a motor vehicle, which includes two of the constant velocity joints of our invention and a freely displaceable intermediate shaft interconnecting them. Since the intermediate shaft is supported only in the joints, when the vehicle travels around curves, the centrifugal force acting on the intermediate shaft tends to displace it axially until it reaches a limit provided in one of the joints. Since a centrifugal force can occur in both directions in such a Cardan shaft, in accordance with another feature of our invention, the two spherical surface portions on the inner joint members of the two joints are located at opposite ends of the respective joints.

Other features which are considered as characteristic for the invention are set forth in the appended claims.

Although the invention is illustrated and described herein as embodied in constant velocity joint, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which.

Figure 1:
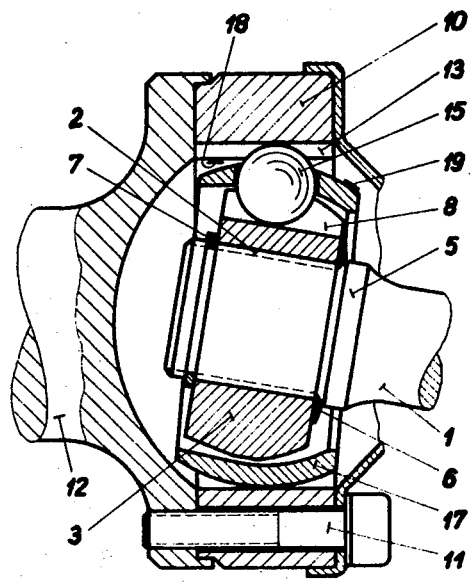
FIG. 1 is a longitudinal sectional view of a joint according to the invention.
Figure 2:
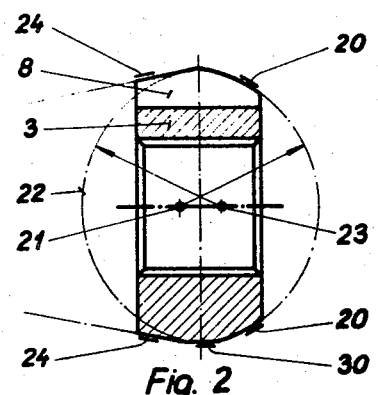
FIG. 2 is a longitudinal section view of the inner joint body member of the joint of FIG. 1.
Figure 3:
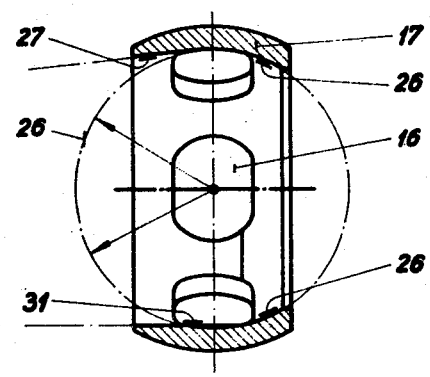
FIG. 3 is a longitudinal sectional view of the cage of the joint of FIG. 1.

Referring now to the drawing and first, particularly to FIGS. 1 to 3 thereof, there is shown a constant velocity universal joint according to our invention having an inner joint 3 splined by splines 2 onto a shaft 1. The inner joint body 3 is held firmly in position on the shaft 1 by a collar 5 formed on the shaft 1 and a disc spring 6 bearing against the collars on one side and a circlip 7 on the other side. In the peripheral surface of the inner joint member 3, six grooves 8, each having a center line extending along a helix or a tangent to a helix, are machined, the grooves 8 having alternately opposite pitches. In FIGS. 1 and 2, the groove 8 is shown projected into the plane of the drawing for the sake of simplicity.

The inner joint member 3 is surrounded by an outer joint member 10, fastened by screws 11 to the flange of a second shaft 12. The outer joint member 10 is formed with grooves 13 on the inner surface thereof, each groove 13 having a centerline extending along a helix or a tangent to a helix and having a pitch opposite to the pitch of the groove 8 disposed opposite thereto in the inner joint member. The groove 13 shown in FIG. 1 has also been projected onto the plane of the drawing for the sake of simplicity.

At the intersection point of each cooperating pair of grooves 8 and 13 is a ball 15 which, by cooperation with the grooves 8 and 13 transmits torque between the shafts 1 and 12. All of the balls 15 (only one shown in FIG. 1) are respectively located in apertures 16 of a cage 17, which keeps all the balls 15 disposed in one plane, extending substantially perpendicularly to the plane of the drawing in FIG. 1.

To enable the inner joint body 3 to be freely movable in the axial direction relative to the outer joint member 10, the inner surface 18 of the outer joint member 10 is cylindrical, and the outer surface 19 of the cage 17 is spherical. As shown in the top half of the axial section of FIG. 2, the portion 20 of the outer surface of the inner joint member 3 located at the right-hand side of the figure, is spherical and has a center of curvature 21 lying on the axis of the inner joint member 3. In joints of the prior art, a spherical portion which is a mirror image of the portion 20 is located at the upper left-hand side of FIG. 2 on the imaginary spherical surface 22, shown in phantom, and has the same radius of curvature as that of the spherical portion 20, with the center of curvature 23 thereof being located symmetrically to the center 21 on the axis of the inner joint body 3. In order to increase the axial displaceability of the inner joint member 3 with respect to the outer joint member 10 for such a prior art joint, and to ensure an adequate depth of the groove 8 for torque transmission when the ball 15 rolls in the groove 8 counterclockwise toward the left-hand side of FIG. 1, the left-hand end of the outer surface of the inner joint member 3 is formed with a conical surface 24.

Similarly, the cage 17, as shown in the upper half of FIG. 3, also has only at the right-hand side thereof an internal hollow spherical surface 26 for cooperation with the spherical surface portion 20, in one end position. At the other end, however, as obvious from comparison with the hollow spherical portion 20, the inner surface flares outwardly to form a conical surface 27, having a sharper cone angle than the conical surface 24. The relationship between the cone angles of the conical surfaces 24 and 27 depends upon the extent of bending of the joint to be accommodated in the axially displaced or other end position. The cone angle of the hollow conical surface 27 may even be zero, so that the surface 27 of the cage 17 may in fact be cylindrical.

It is unnecessary for the spherical surface portion 20 and the conical surface 24 to adjoin each other directly, as shown in the top half of FIG. 2, but the two surfaces 20 and 24 may be separated from one another by a cylindrical surface 30, as shown in the bottom half of FIG. 2. In this case, as is apparent from the lower half of FIG. 3, the cage 17 can be formed with a corresponding hollow cylindrical surface 31 located between the spherical zone surface 26 and the conical surface 27. It is assumed, in the lower part of FIG. 4, that it is necessary, in order to effect adequate deflection of the joint in the end position that at this end of the cage, the inner surface thereof is a hollow cylindrical surface which coincides with the hollow cylindrical surface 31.

Figure 4:
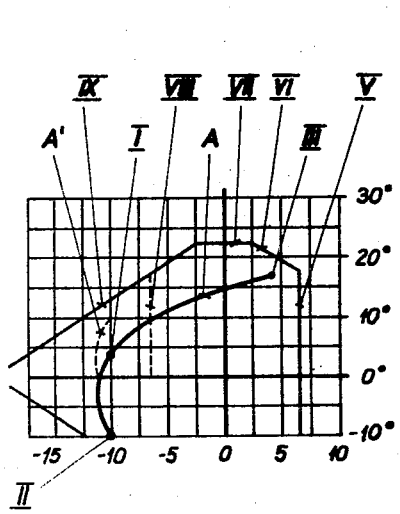
FIG. 4 is a plot diagram showing the relationship between the angle of deflection as ordinate and the relative displacement distance of the inner and outer joint members as abscissae.
Figure 5:
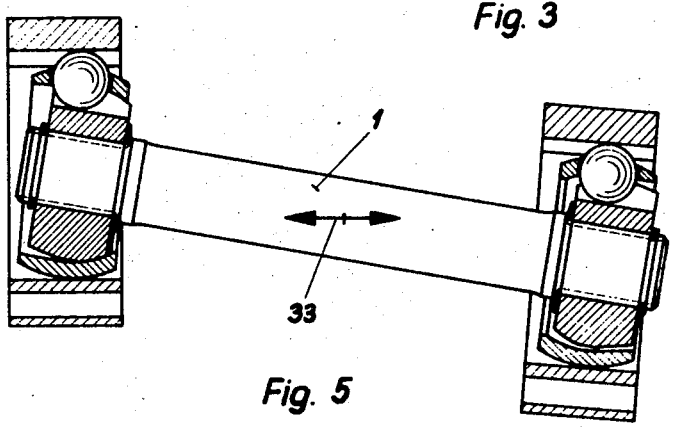
FIG. 5 is a longitudinal sectional view of a Cardan shaft with two joints according to FIG. 1, shown in reduced size.

In FIG. 4, curve A represents the relationship between the angle of deflection and the relative axial displacement of both joint members of a constant velocity universal joint which is required for a Cardan shaft having two of such universal joints and an intermediate shaft connecting them is shown in FIG. 5, and which serves to drive a motor vehicle wheel suspended from a trapezoidal link. Point I shows the relationship between reflection angle and axial location of the joint member of one of the two universal joints in the normal position of the motor vehicle. Point II shows the relationship when the wheel has moved upwardly to its upper end position, and point III the relationship when the wheel has moved downwardly to its lowermost end position. Since the universal joint rotates in operation during torque transmission, there are no positive and negative angles of deflection but only an absolute value of the angle of deflection. Thus, the lower branch of curve A in FIG. 4 has been rotated or projected upwardly about the abscissa corresponding to the 0° deflection angle (note the curve branch A' shown in the dotted line). In addition, FIG. 4 shows the range of the angle of deflection limited by the construction of the joint, in the different relative axial positions of both joint members 3 and 10. The line V results from the cooperation of the spherical surface portion 20 of the inner joint member 3 with the hollow spherical surface 26 of the cage, the maximum deflection angle of 17.5° being determined by the peripheral length of the aperture 16.

Since the grooves 8 and 13 in the inner and outer joint members 3 and 10, respectively, have alternately opposite pitches, the peripheral spacings between the intersection points of the groove pairs at which the balls 15 are always located, vary during the axial relative displacement of the joint members and since the intersection points of the grooves lie in the constant velocity plane bisecting the angle of deflection of the joint when the joint is deflected, the intersection points of the groove pairs at the side of the joint at which the axes of the shafts of the deflected joint form an obtuse angle, travel even farther in one or the other direction. The cage apertures 16, however can only extend so far in peripheral direction so that one crosspiece still remains therebetween to maintain the rigidity of the cage 17. Due to both of these facts, the angle of deflection of the joint at which the balls abut against the ends of the cage apertures is smaller in the end positions of the joint when there is greater axial displacement.

During a displacement of the inner joint member 3 from the end position at the right-hand side of FIG. 1 to the center thereof, the balls 15 also move back in the apertures 16 in peripheral direction farther into the center and more deflection is possible as indicated by the line VI, until the angle of deflection reaches the maximum value of 22.5° determined solely by the peripheral or circumferential length of the apertures. This limitation is indicated by the line VII. If the inner joint member 3 and the cage 17 were to have had at the other end, as in the prior art joint, corresponding surfaces located in mirror-image fashion to the spherical surface portion 20 and the hollow spherical surface 26, and cooperating with one another in the other end position, the displacement distance of the inner joint member 3 to the left-hand side, as viewed in FIG. 1, would be limited by the dotted line VIII. Since the outer surface at this end is formed by a conical surface 24, however, and at the same end, the cage 17 is provided with a hollow conical surface 27, which has a sharper cone angle than that of the conical surface 24, the angle being selected so that the limit of the angle of deflection is not imposed by the mutual abutment of the inner joint member 3 and the cage 17 but rather by the engagement of the balls 15 with the ends of the cage apertures 16 beforehand, the limit line at this end of the relative displacement of the joint members 3 and 10 is given by the line IX, which is inclined to the abscissa at the same angle as the line VI but opposite thereto.

It is obvious that in the construction of the universal joint according to our invention, the relative displaceability of the two joint members 3 and 10 is much greater than in a universal joint of the same dimensions, wherein the end positions, as in the prior art joint, are given by the distance between the respective centers of curvature 21 and 23 (FIG. 2). It is furthermore apparent that the family of curves A, A' lies completely within the limit lines V, VI, VII and IX and has a safety margin relative thereto so that even with the tolerances of the parts occurring in practice, the limit lines are not completely reached, and therefore the joint functions satisfactorily even in the most unfavorable situation.

In the Cardan shaft of FIG. 5, the joint on the left-hand side of the figure corresponds to the joint shown in FIG. 1, while the joint on the right-hand side of FIG. 5 is of exactly the same construction as the other joint but is a mirror image thereof. In the latter joint, the spherical surface portion 20 on the inner joint member 3 and the hollow spherical surface 26 in the cage 17 therefore are directed to the left-hand side of FIG. 5 instead of to the right-hand side, as in the case of the joint of FIG. 1. Since a centrifugal force, which is represented by the double-headed arrow 33, acts in one or the other direction on the intermediate shaft 1 of the Cardan shaft when a motor vehicle, whose drive wheel is suspended from a trapezoidal link driven by the Cardan shaft travels around curves, upon displacement of the Cardan shaft toward the right-hand side of FIG. 5, the spherical surfaces of the inner joint member and the cage in the joint on the left-hand side of FIG. 5 abut against each other, as do the corresponding spherical surfaces in the joint on the right-hand side of FIG. 5 when the Cardan shaft 1 is displaced to the left-hand side of the figure, while the function of the joint is not thereby disturbed. In operation, the Cardan shaft extends transversely to the motor vehicle so as to drive a wheel from a transverse engine located between a pair of the wheels of the vehicle. Freedom must be provided for relative vertical movement. It is readily discernible that in each of the two joints of FIG. 5 only the displacement in one direction has to be limited if the two joints are installed as mirror images of one another. Nonillustrated means may be provided in each joint of FIG. 5 which tend to force the inner joint member continuously into its axial central position relative to the outer joint member, so that in the course of normal vehicular travel, during which no centrifugal force acts, the displacement distance of the inner joint member of both joints is distributed uniformly over both joints and, accordingly the intermediate shaft returns to its central position.

We claim:

1. Constant velocity joint comprising an inner joint member axially displaceable with respect to a surrounding outer joint member, said outer joint member having an inner surface formed with grooves and said inner joint member having an outer surface formed with grooves, a plurality of balls respectively disposed within corresponding grooves of said inner and outer joint members for transmitting torque therebetween, cage means located between said inner and outer joint members and adapted to retain said plurality of balls in a common plane, said outer surface of said inner joint member at one axial end thereof having a spherical surface portion and at the other axial end thereof having a frustoconical surface portion.

2. Joint according to claim 1, wherein said grooves formed in said inner and outer joint members are disposed in respective pairs opposite one another, the grooves of each pair being respective longitudinal center lines intersecting one another in said common plane wherein said balls are retained.

3. Joint according to claim 1, wherein said inner surface of said outer joint member is cylindrical, and said cage means has a spherical outer surface.

4. Joint according to claim 1, wherein said cage means has an inner surface at said one axial end formed with a spherical surface portion.

5. Joint according to claim 4, wherein said cage means has an inner surface at said other axial end formed with a frustoconical surface portion.

6. Joint according to claim 5, wherein said frustoconical surface portion of said cage means has a sharper cone angle than the cone angle of said frustoconical surface portion of said inner joint member.

7. Joint according to claim 4, wherein said cage means has an inner surface at said other axial end formed with a substantially cylindrical surface portion.

8. Joint according to claim 1, wherein said cage means has an inner surface spaced from said inner joint member so as to afford axial displacement thereof with respect to said inner joint member.

9. Joint according to claim 1, wherein said cage means is displaceable in all axial positions of said inner joint member through a given angle determined by a relationship between an angle of deflection of the joint and a relative displacement distance between said inner and outer joint members, before abutting against the outer surface of said inner joint member.

10. A Cardan shaft including two of the constant velocity joints according to claim 1, the two joints being located at opposite ends of an intermediate shaft, the respective spherical surface portions on said inner joint members and said cage means of the two joints being located at opposite ends of the respective joints.